United States Patent [19]
Czachor et al.

[11] Patent Number: 5,451,116
[45] Date of Patent: Sep. 19, 1995

[54] TRIPOD PLATE FOR TURBINE FLOWPATH

[75] Inventors: Robert P. Czachor; Scott P. Ryczek, both of Cincinnati; Michael R. Hesselbrock, Hamilton, all of Ohio

[73] Assignee: General Electric Company, Cincinnati, Ohio

[21] Appl. No.: 99,637

[22] Filed: Jul. 30, 1993

Related U.S. Application Data

[63] Continuation-in-part of Ser. No. 896,021, Jun. 9, 1992, abandoned.

[51] Int. Cl.⁶ .............................. F16B 2/02
[52] U.S. Cl. .................... 403/338; 403/28; 403/41; 403/71; 403/405.1; 411/160
[58] Field of Search ............... 403/28, 41, 70, 71, 403/68, 24, 337–338, 286, 405.1, 409.1; 411/160, 169, 537, 956, 957, 973

[56] References Cited

U.S. PATENT DOCUMENTS

| | | | |
|---|---|---|---|
| 299,987 | 6/1884 | Jordan | 411/160 X |
| 1,107,792 | 8/1914 | Houston | 411/957 X |
| 1,606,509 | 11/1926 | Campbell | 403/405.1 X |
| 2,175,453 | 10/1939 | Barcy | 403/405.1 |
| 3,263,727 | 8/1966 | Herpolsheimer | 411/956 X |
| 4,921,401 | 5/1990 | Hall et al. | 415/138 |

FOREIGN PATENT DOCUMENTS

| | | |
|---|---|---|
| 0427030 | 5/1991 | European Pat. Off. . |
| 0541147 | 5/1993 | European Pat. Off. . |
| 1193489 | 11/1959 | France .............. 411/537 |
| 0483121 | 4/1938 | United Kingdom . |
| 0556914 | 10/1943 | United Kingdom . |
| 0629096 | 9/1949 | United Kingdom . |
| 00846329 | 12/1957 | United Kingdom . |
| 2153947 | 8/1985 | United Kingdom . |
| 2226600 | 7/1990 | United Kingdom . |
| 2262573 | 6/1993 | United Kingdom . |

*Primary Examiner*—Randolph A. Reese
*Assistant Examiner*—Harry C. Kim
*Attorney, Agent, or Firm*—Andrew C. Hess; David L. Narciso

[57] ABSTRACT

A turbine flowpath assembly includes a plurality of circumferentially spaced apart airfoils disposed within an annular outer casing. Each of the airfoils includes outer and inner integral bands. A plurality of flowpath outer and inner panels are disposed between adjacent ones of the bands and circumferentially overlap the bands. The panels and bands are joined together at the respective overlaps using tripod plates and fasteners therethrough for allowing circumferential movement therebetween while providing sealing.

8 Claims, 8 Drawing Sheets

TRIPOD PLATE FOR TURBINE FLOWPATH

This is a continuation in-part of application Ser. No. 07/896,021, filed Jun. 9, 1992, now abandoned.

The present invention relates generally to gas turbine engines, and, more specifically, to a turbine flowpath therein.

BACKGROUND OF THE INVENTION

A conventional gas turbine engine includes a compressor for providing compressed air to a combustor wherein it is mixed with fuel and ignited for generating combustion gases. The hot combustion gases are channeled to turbine blade-rows for extracting energy therefrom for powering the compressor and for generating thrust in propelling an aircraft, for example. All of the turbine flowpaths which channel the combustion gases are heated thereby and are subject to thermally induced stress therein. Since a turbine is axisymmetrical, the many annular structures therein are subject to radial thermal growth which increases their diameter and circumference when heated by the combustion gases. In order to reduce the thermal growth and stresses therein, the flowpaths are typically configured as circumferentially segmented components which permit unrestrained circumferential, or tangential, thermal expansion of the individual components, as well as radial thermal expansion thereof.

For example, conventional stator shrouds surrounding turbine blade-rows comprise a plurality of circumferentially adjoining individual shrouds or shroud segments which are conventionally joined to an annular outer casing. The inner surfaces of the shrouds form the radially outer flowpath of the combustion gases, and the outer surfaces of the shrouds are provided with cooling air channeled through the outer casing for cooling the shrouds. Since the outer casing is an annular structure maintained at a lower temperature than the shrouds being heated by the combustion gases, it expands radially outwardly at a different rate than that of the shrouds. If the shrouds were a fully annular, non-segmented structure, considerable thermal stress would be generated therein due, in part, to the restraint provided by the outer casing to which the shroud is attached.

By circumferentially segmenting the shroud, it is allowed to freely expand and contract in the circumferential direction which reduces thermal stress therein. However, suitable seals must then be provided between the individual segmented shrouds to prevent escape of the combustion gases radially outwardly toward the outer casing as well as prevent leakage of the compressed cooling air radially inwardly therebetween into the hot combustion gases. Sealing between the segmented shrouds is typically accomplished with conventional spline seals which are straight members disposed in complementary, U-shaped circumferentially facing slots disposed in the shroud edges. A predetermined radial gap is provided between the spline seal and its complementary slots for allowing alignment and assembly of the adjacent shrouds while still providing effective sealing therebetween.

A conventional turbine nozzle provides another example of a segmented flowpath wherein the individual nozzle stator vanes include radially outer and inner bands formed integrally with the vanes, which bands have a large circumferential overhang relative to the airfoil to adjoin adjacent vanes. The circumferential edges of the vane bands are also sealed using conventional spline seals.

As the diameter of the turbine flowpaths increase for larger and larger gas turbine engines, several significant problems arise. For example, relatively large circumferential and axial dimensions of individual flowpath segments create unavoidable fit-up difficulties at the segment edges during assembly. Both manufacturing variations and operation induced creep deformations of the segments increase the difficulty of alignment and installation of the axially extending spline seals therebetween. In the example of the nozzle vanes, large circumferential overhang of the vane bands increases the potential for dimensional variations thereof resulting in radial misalignment between adjacent vane bands.

The misalignment of adjacent bands significantly reduces the ability of the spline seals to form an effective seal therebetween. Conventional spline seals require two flat and parallel surfaces for the backside pressure provided by the compressed air to load the spline seal itself radially inwardly in its respective slot to form an effective seal therewith. Misalignment of the slot increases leakage past the spline seal significantly.

The relatively large length of the axial splitline in large diameter applications, increases the difficulty of spline seal design especially where the required joint to be sealed is nonlinear. Since spline seals must be straight in the axial plane of the engine in order to effectively seal a large number of axially spaced apart spline seals must be used to follow an axially varying or arcuate flowpath contour to provide effective sealing between the circumferentially adjacent components. A highly curved axial flowpath also increases the difficulty of radial alignment of the adjacent components during initial assembly. And, during operation as the components vary in configuration due to creep deformations thereof, maintaining alignment between the components becomes more difficult, and the ability of the spline seals to effectively seal the flowpath is further increased.

Tests have shown that spline seals in conventional shroud and nozzle applications, have relatively large leakage rates consistent with an effective 0.05 mm gap at the sealing surface. As the axial length of the sealed joint increases, leakage rates are further increased.

SUMMARY OF THE INVENTION

A turbine flowpath assembly includes a plurality of circumferentially spaced apart airfoils disposed within an annular outer casing. Each of the airfoils includes outer and inner integral bands. A plurality of flowpath outer and inner panels are disposed between adjacent ones of the bands and circumferentially overlap the bands. The panels and bands are joined together at the respective overlaps using tripod plates and fasteners therethrough for allowing circumferential movement therebetween while providing sealing.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
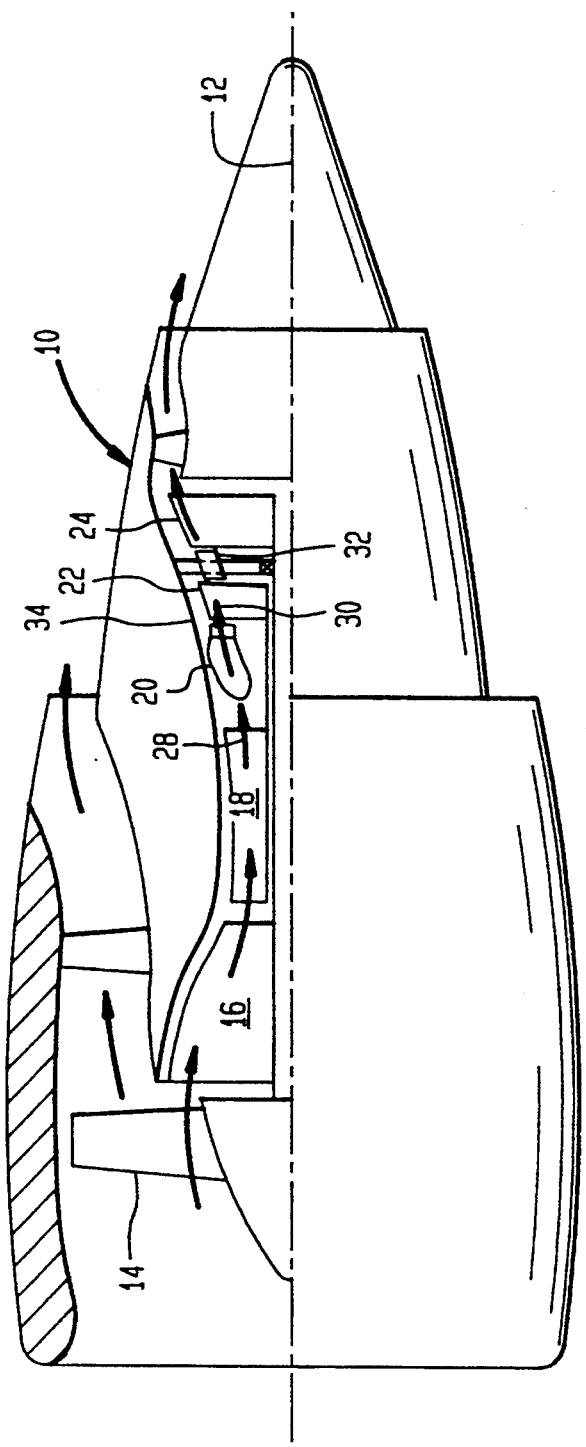
FIG. 1 is an axial, partly sectional view of an exemplary turbofan gas turbine engine including a turbine flowpath assembly in accordance with one embodiment of the present invention.

Illustrated in FIG. 1 is a schematic representative of an exemplary turbofan gas turbine engine 10 having a longitudinal or axial centerline axis 12. The engine 10 includes in serial flow communication a fan 14, a booster compressor 16, a high pressure compressor 18, a combustor 20, a high pressure turbine (HPT) 22, and a low pressure turbine (LPT) 24 all of which are conventional. Ambient air 26 first enters the fan 14 and is compressed in turn through the compressors 16 and 18 for providing compressed air 28 to the combustor 20 wherein it is conventionally mixed with fuel and ignited for generating hot combustion gases 30 which flow in turn through the HPT 22 and the LPT 24 which extract energy therefrom for powering the fan 14 and the compressors 16 and 18.

Figure 2:
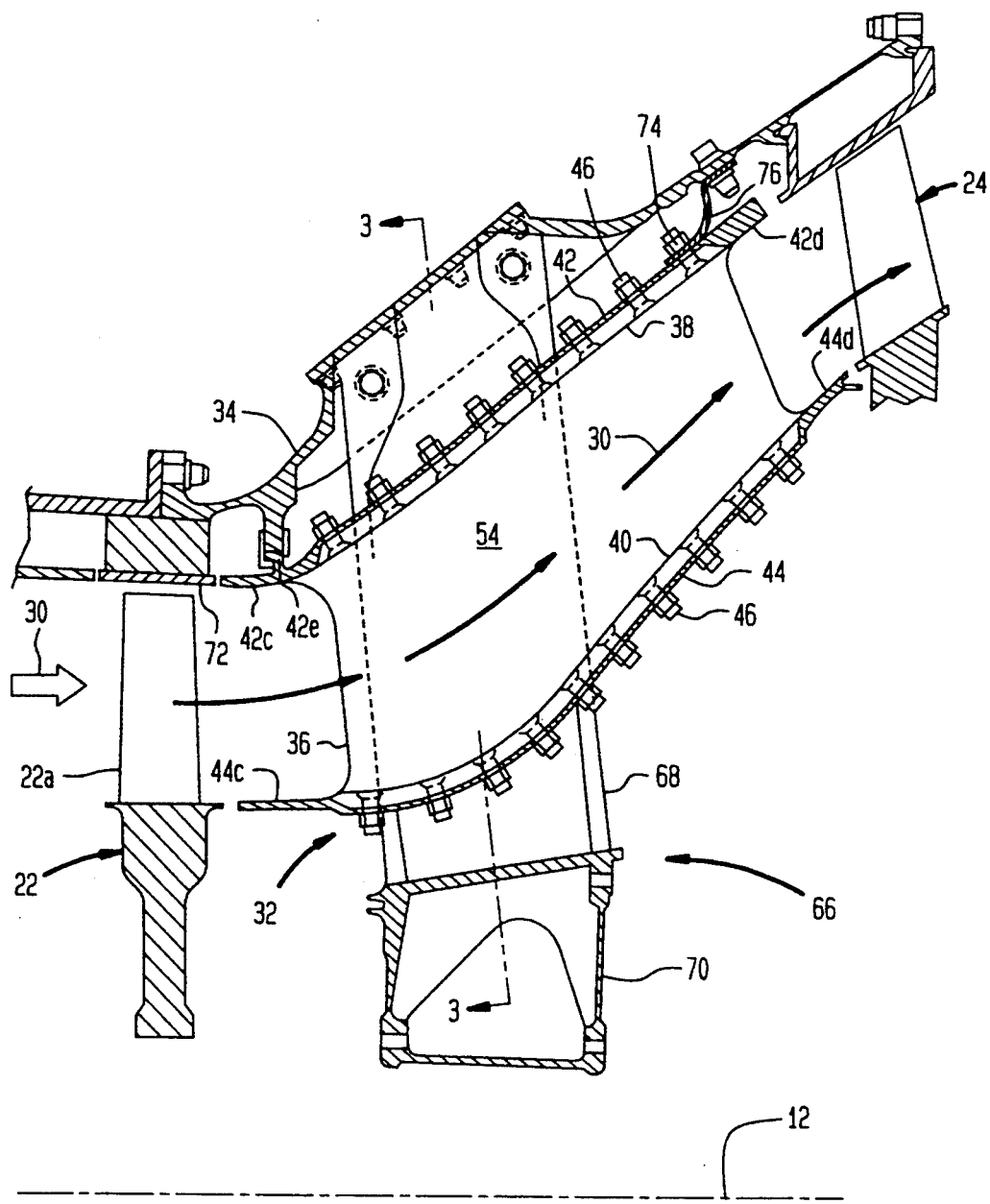
FIG. 2 is an enlarged axial, partly sectional view of the turbine flowpath assembly illustrated in FIG. 1.

A turbine flowpath assembly 32 in the exemplary form of a transition duct in accordance with one embodiment of the present invention is provided in the center frame between the HPT 22 and the LPT 24 for channeling the combustion gases 30 therebetween. FIG. 2 illustrates in greater detail the upper portion of the assembly 32 shown in FIG. 1 between the HPT 22 and the LPT 24. The assembly 32 includes a conventional annular outer casing 34 disposed coaxially about the longitudinal axis 12, and a plurality of circumferentially spaced apart fairings or airfoils 36 as additionally shown in FIGS. 3-7. Each of the airfoils 36 includes an integral radially outer platform or band 38 which forms a portion of the radially outer flowpath confining the combustion gases 30, and an integral radially inner platform or band 40 forming a portion of the radially inner flowpath confining the combustion gases 30. The outer bands 38 are joined to the outer casing 34.

Figure 3:
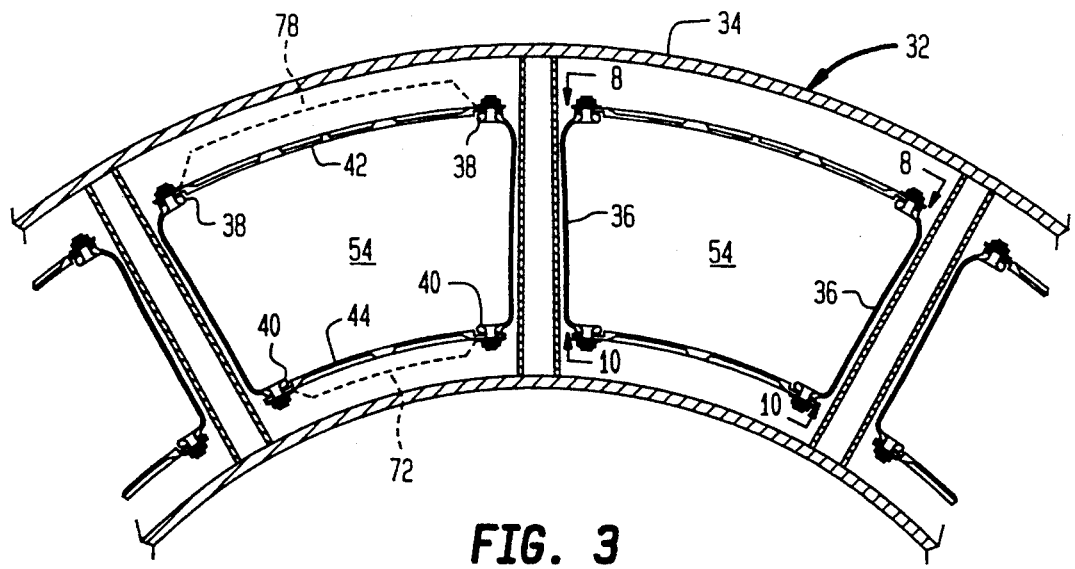
FIG. 3 is a radial sectional view of a portion of the turbine flowpath assembly illustrated in FIG. 2 taken along line 3—3.

The assembly 32 further includes a plurality of radially outer flowpath panels 42 joined to the outer casing 34, and a plurality of radially inner flowpath panels 44 spaced radially inwardly from and directly below respective ones of the outer panels 42. The outer and inner panels 42 and 44 are illustrated in more detail in FIGS. 2-4 and 8-11. As shown in FIG. 3, each of the outer panels 42 is disposed circumferentially between adjacent ones of the outer bands 38, and as shown in greater detail in FIG. 4, each of the outer panels 42 circumferentially overlaps adjacent ones of the outer bands 38, with the outer panel 42 being disposed radially above the outer band 38. Similarly, each of the inner panels 44 is disposed circumferentially between adjacent ones of the inner bands 40, with each of the inner panels 44 circumferentially overlapping an adjacent inner band 40, with the inner panel 44 being disposed radially below the inner band 40.

Figure 4:
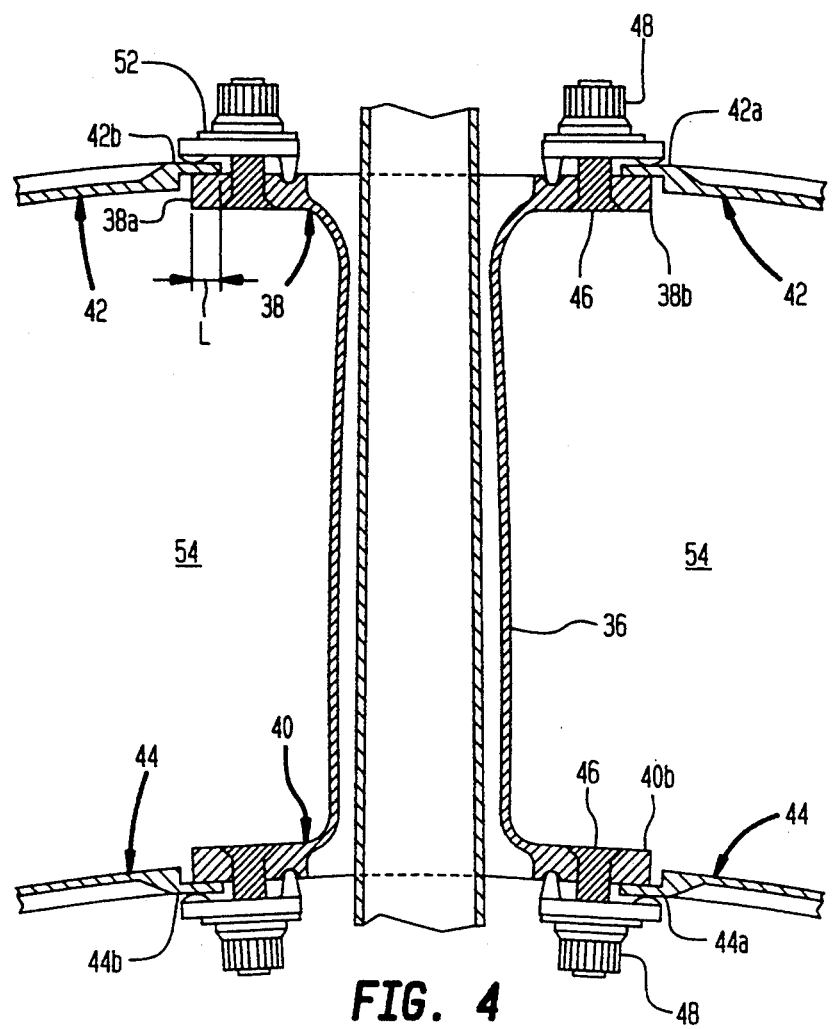
FIG. 4 is an enlarged radial sectional view of one of the airfoils illustrated in FIG. 3.

Means in the exemplary form of a plurality of joining bolts 46, complementary locknuts 48, tripod plates 50, and spherical washers 52 are provided for joining together the outer panels 42 with the outer bands 38, and the inner panels 44 with the inner bands 40 at the respective overlaps thereof for allowing limited circumferential movement therebetween. As shown in FIGS. 3 and 4, the turbine flowpath assembly 32 is a circumferentially segmented assembly formed of individual components joined together in segmented rings to define a plurality of circumferentially spaced apart flow ducts 54 for channeling the combustion gases 30 from the HPT 22 to the LPT 24 (see FIG. 2). The outer bands and panels 38 and 42 provide a radially outer boundary for the combustion gases 30, and the inner bands and panels 40, 44 provide a radially inner boundary for the combustion gases 30. The airfoils 36 provide radially extending, lateral boundaries for the combustion gases 30.

Figure 8:
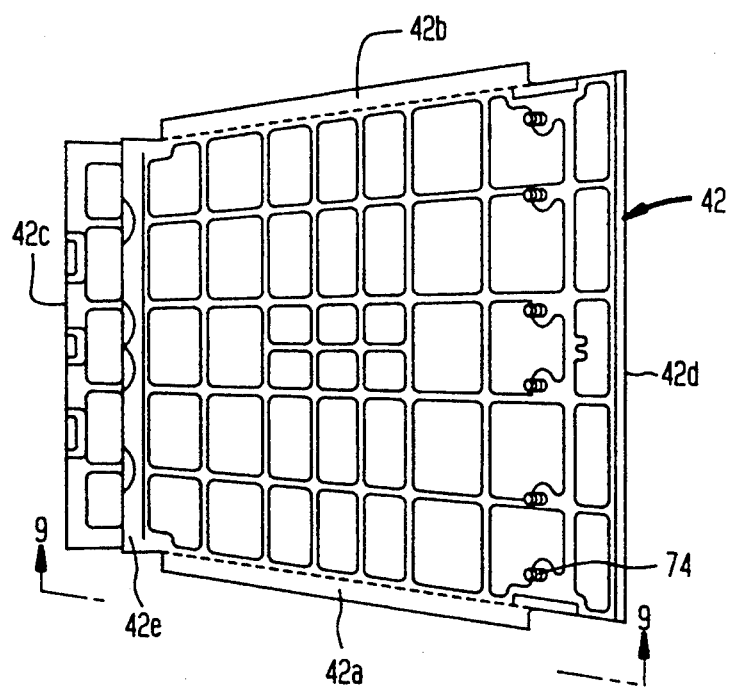
FIG. 8 is a top view of one of the outer flowpath panels illustrated in FIG. 3 along line 8—8 disassembled from the flowpath assembly.
Figure 9:
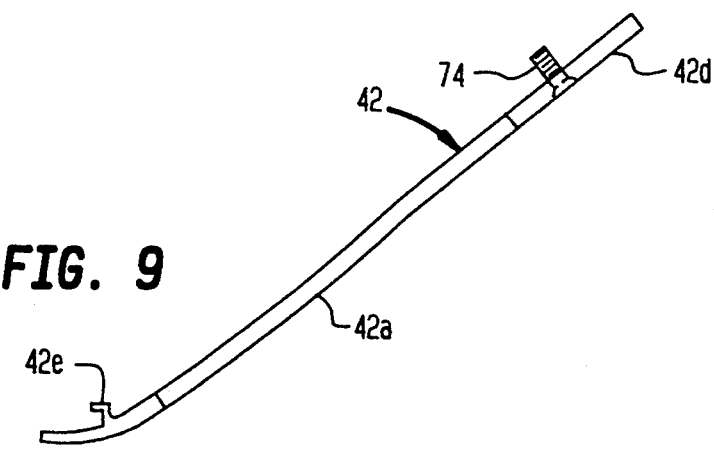
FIG. 9 is a side view of the outer panel illustrated in FIG. 8 taken along line 9—9.
Figure 10:
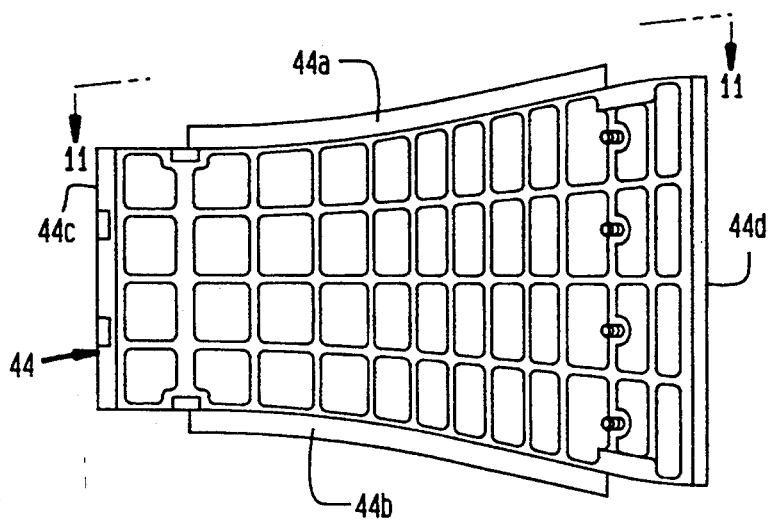
FIG. 10 is a bottom view of one of the inner flowpath panels illustrated in FIG. 3 taken along line 10—10 disassembled from the flowpath assembly.

Referring to FIGS. 8 and 10, each of the outer and inner panels 42 and 44 is generally rectangular in configuration and has respective first and second circumferentially oppositely extending sides or edges 42a and 42b for the outer panels 42, and 44a and 44b for the inner panels 44. The outer panels 42 also include forward and aft ends 42c and 42d, respectively, and the inner panels 44 similarly include forward ends 44c and aft ends 44d. Each of the outer and inner panel first and second edges 42a, 42b, 44a, 44b is plain without slots or holes therein, although slots or scallops may be provided therein for increasing clearance with the joining bolts 46.

Figure 6:
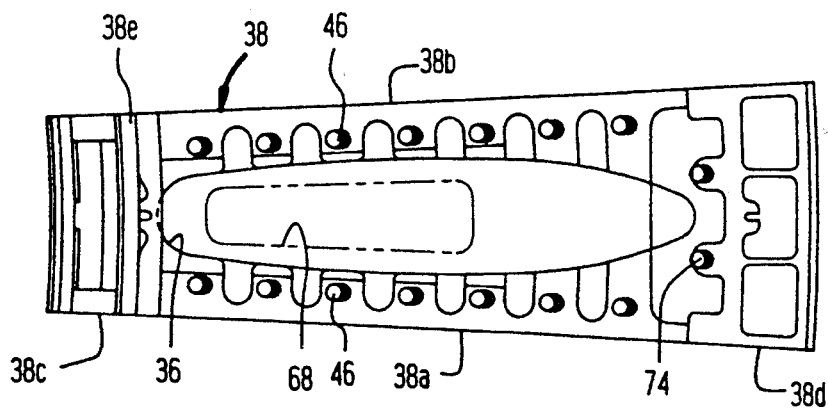
FIG. 6 is a top view of the outer band of the airfoil illustrated in FIG. 5 taken along line 6—6.
Figure 5:
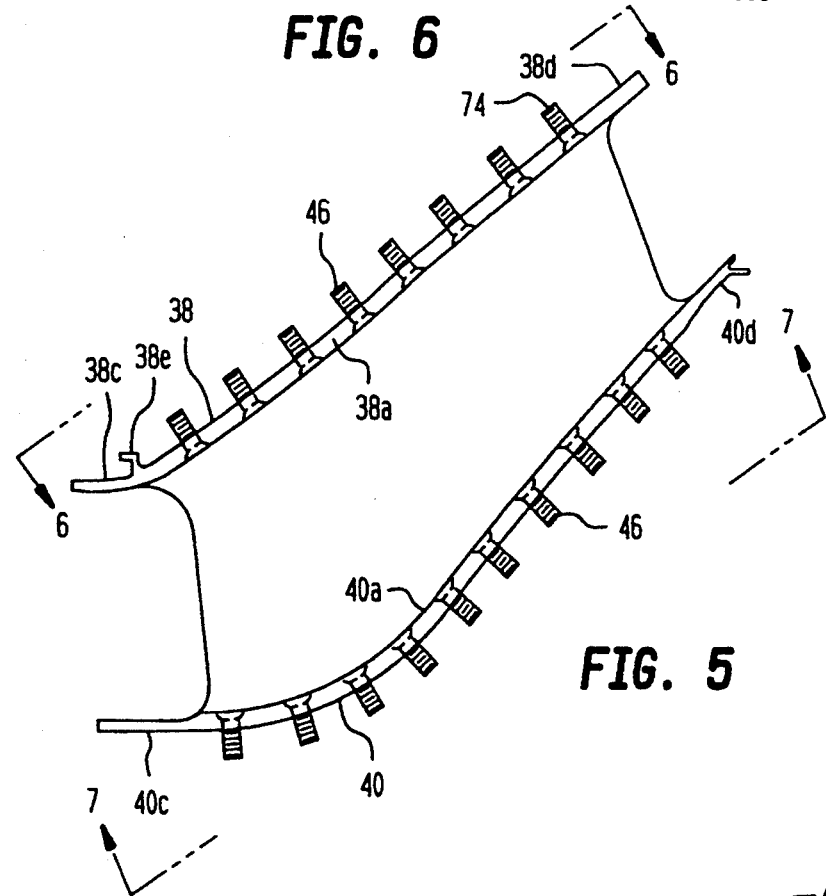
FIG. 5 is an axial view of one of the airfoils illustrated in FIG. 2 disassembled from the flowpath assembly.
Figure 7:
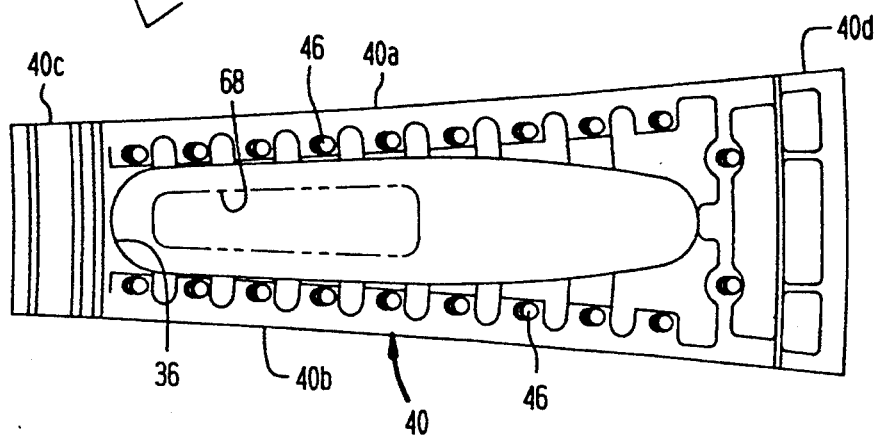
FIG. 7 is a bottom view of an inner band of the airfoil illustrated in FIG. 5 taken along line 7—7.

As shown in FIGS. 5-7, each of the outer and inner bands 38, 40 is also generally rectangular in configuration and has respective first and second, circumferentially oppositely extending sides or edges 38a, 38b, 40a, and 40b. The outer and inner bands 38, 40 also similarly include respective forward and aft ends 38c, 38d, 40c, and 40d. Each of the first and second edges 38a, 38b, 40a, 40b of the respective outer and inner bands 38 and 40 has a plurality of axially spaced apart ones of the joining bolts 46 fixedly joined thereto by brazing, for example. The joining bolts 46 preferably extend radially outwardly from the outer band 38 and radially inwardly from the inner band 40. The number of joining bolts 46 on each edge of the respective bands 38, 40 is selected as needed for each design to ensure an effective joint in the axial direction.

Figure 13:
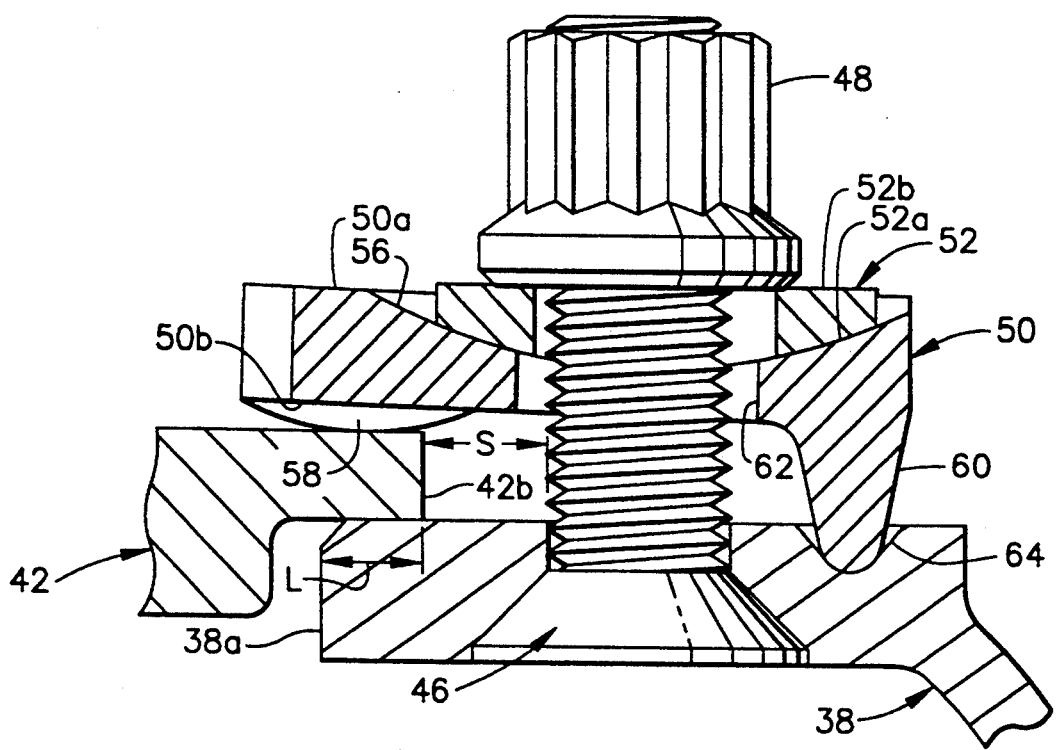
FIG. 13 is a partly sectional enlarged view of one of the joints of the adjacent outer band and panel illustrated in FIG. 4.

As illustrated in FIG. 4 and in more particularity in FIG. 13, each of the joining bolts 46 extends through the respective outer and inner bands 38, 40 with its head suitably brazed thereto. Accordingly, any transverse loads applied on the bolts 46 will place the bolt in bending and increase the stress therein which will decrease the useful life of the bolt 46. However, the bolt 46 must nevertheless join together the respective bands and panels to provide effective sealing therebetween. As shown in FIGS. 3–5, 9, and 11, the respective outer bands and panels 38, 42 and inner bands and panels 40, 44 have compound curvature both around the circumference thereof in the tangential direction and in the axial direction due to the radially outward curvature of the flow duct 54. Accordingly, the flat underside of the locknuts 48 may not simply be supported on the arcuate outer surface of the outer panel 42 or the arcuate inner surface of the inner panel 44 since the resulting uncontrolled contact area can effect bending loads in the bolts 46. Furthermore, relative tangential or differential circumferential movement between the respective bands and panels due to thermal expansion and contraction in operation prevents the use of flat seating surfaces for the locknuts 48 directly on the panels 42, 44 since misalignment therebetween will occur during operation and again effect bending loads in the bolts 46. Yet further, simply mounting the locknuts 48 directly on the panels 42, 44 will also lead to tangentially directed friction loads therebetween which will also effect bending of the bolts 46 during differential thermal expansion and contraction of the bands and panels. And, wear resulting from such friction will loosen the joint over time and lead to undesirable increased leakage therethrough decreasing engine performance.

In order to prevent or reduce bending loads being applied on the joining bolts 46 and to maintain the efficiency of sealing at the joints between the bands and panels notwithstanding wear, the tripod plate 50 as illustrated in more particularity in FIG. 13 in combination with the spherical washer 52 is utilized in accordance with one embodiment of the present invention. The tripod plate 50 is illustrated in its assembled position in an exemplary joint formed between the outer band 38 and the outer panel 42. The tripod plate 50 is illustrated alone in the several views in FIGS. 14–16 to show its features more clearly.

Figure 15:
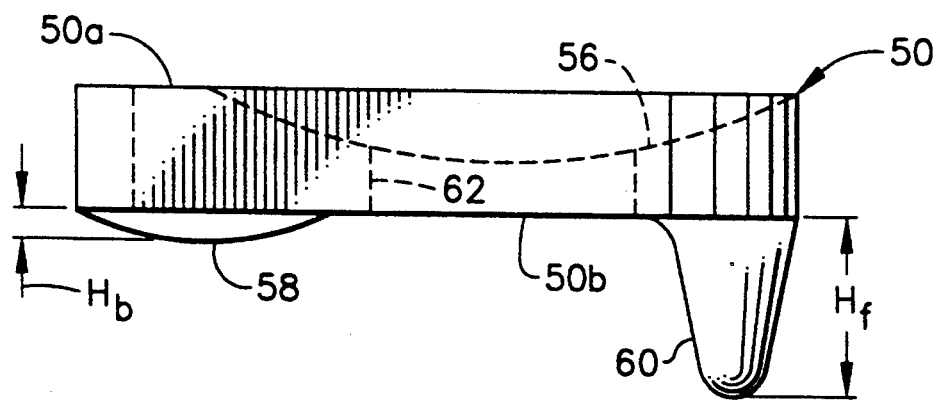
FIG. 15 is a side view of the tripod plate illustrated in FIG. 14 taken along line 15—15.

More specifically, the tripod plate 50 is preferably a single piece, conventional casting having a first or radially upper surface 50a having a spherical seat 56. The seat 56 in the preferred embodiment illustrated is an indentation which is concave outwardly and forms an annular portion of a sphere. The tripod plate 50 also includes a second, oppositely facing, radially inner surface 50b having a pair of laterally spaced apart protrusions or elevated (downwardly) buttons 58 at a first end of the plate 50, with the buttons 58 preferably having identical heights $H_b$ as shown in FIG. 15. The plate inner surface 50b also includes a single elevated (downwardly) protrusion or foot 60 spaced from the buttons 58 at a second or opposite end of the plate 50. The foot 60 has a height $H_f$, and the buttons 58 are convex and sized shorter than the foot 60, with $H_b$ being less than $H_f$, for contacting the outer surface of the outer panel 42 and allowing sliding movement of the panel 42 relative to the outer band 38 as shown in FIG. 13, with the foot 60 being suitably locked into position on the outer band 38 as further described below.

Figure 12:
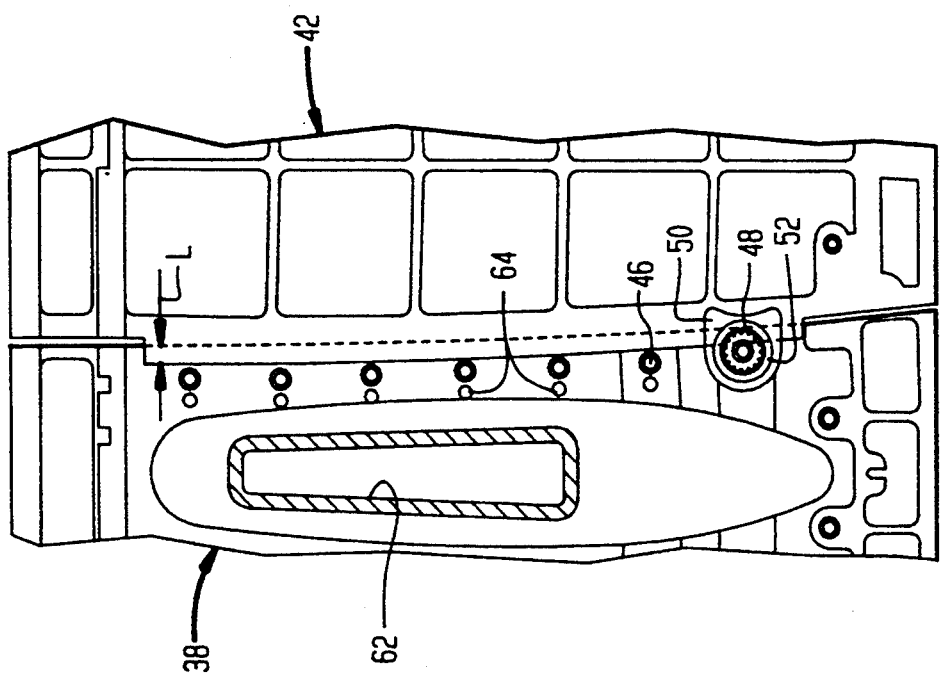
FIG. 12 is a top view of an adjacent outer band and panel axially aligned relative to each other prior upon assembly thereof.
Figure 11:
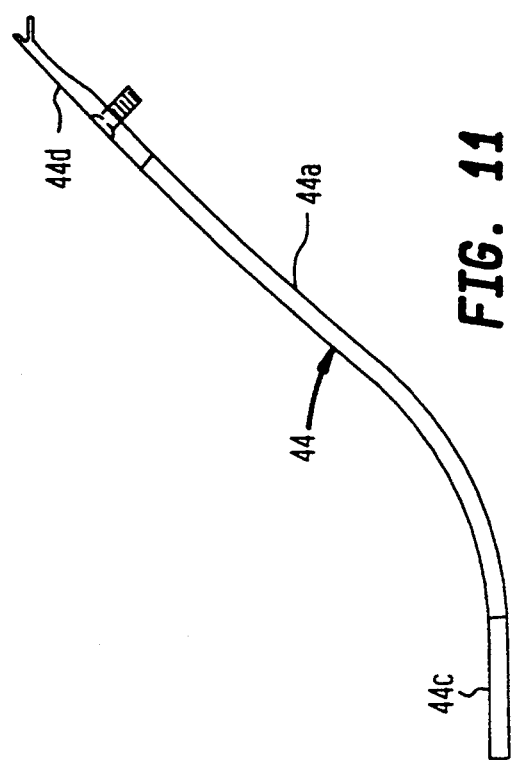
FIG. 11 is a side view of the inner panel illustrated in FIG. 10 taken along line 11—11.
Figure 14:
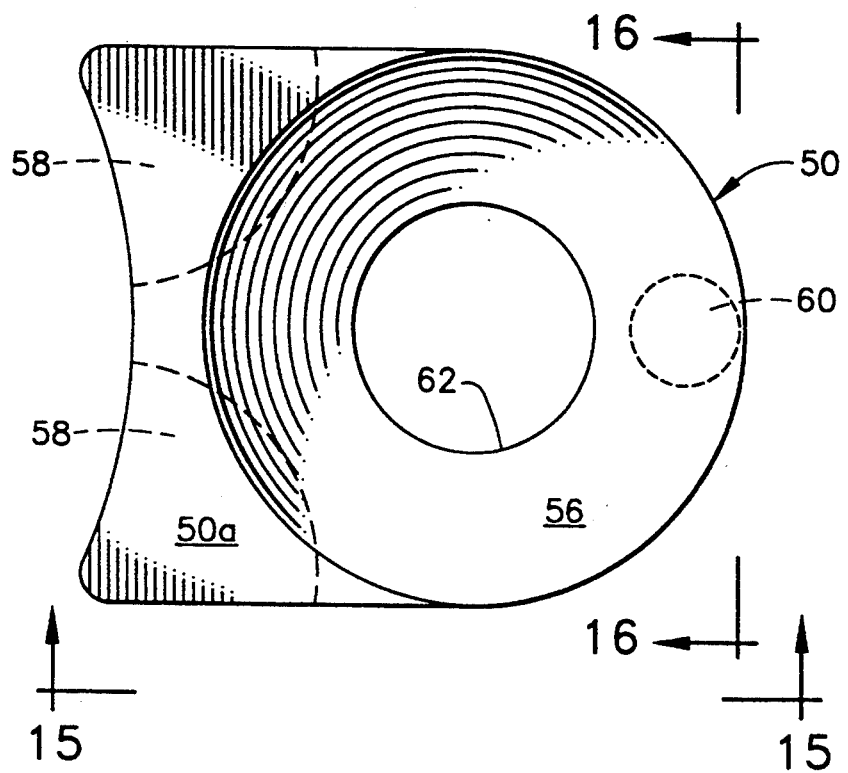
FIG. 14 is an enlarged top view of one of the tripod plates used in the joints between the outer and inner bands and panels illustrated in FIG. 4.
Figure 16:
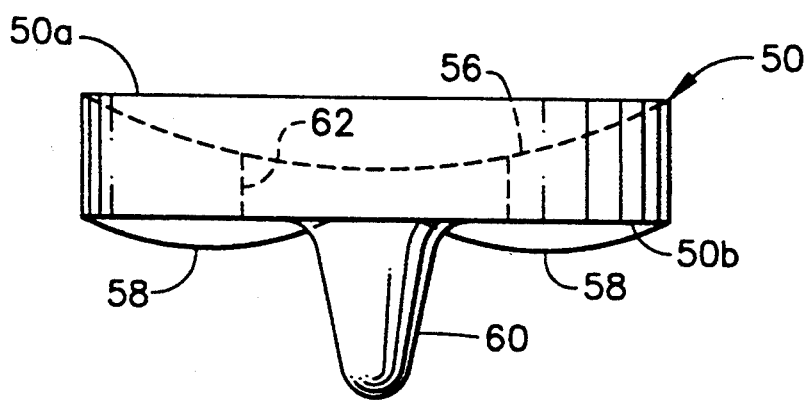
FIG. 16 is a front view of the tripod plate illustrated in FIG. 14 taken along line 16—16.

The tripod plate 50 further includes an access hole 62 extending centrally through the plate 50 between the upper and lower surfaces 50a and 50b. The access hole 62 preferably extends through the center of the spherical seat 56 to the inner surface 50b between the buttons 58 and the foot 60 for receiving therethrough a respective one of the joining bolts 46. As illustrated in FIGS. 14–16, the foot 60 is preferably aligned equidistantly between the two buttons 58 in a tripod configuration forming a generally isosceles triangle. In this way, the three points of contact provided by the two buttons 58 and the single foot 60 allow the tripod plate 50 to be assembled regardless of curvature of the joined panels and bands which allows their thermal expansion and contraction without degradation of the joint therebetween and without imparting significant bending loads on the bolts 46. As shown in FIGS. 12 and 13, the tripod plate 50 simply rests on the three points of contact, with the two buttons 58 being smooth for resting on the outer surface of the outer panel 42, and the single foot 60 resting on the outer band 38, with the plate 50 thereby bridging the outer band and panel 38, 42.

As also shown in FIGS. 12 and 13, the outer bands 38, as well as the inner bands 40, include respective pluralities of locating indentations 64 for receiving and retaining respective ones of the tripod feet 60 at their tips to prevent circumferential movement of the tripod plates 50 themselves. Each of the tripod plates 50 as illustrated for example in FIG. 13 is disposed on a respective one of the joining bolts 46, with the buttons 58 thereof being positioned on the outer panels 42 (and the inner panels 44 as illustrated in FIG. 4), and the feet 60 thereof being positioned on the respective outer bands 38 (and inner bands 40 in FIG. 4) in the respective locating indentations 64. A plurality of the spherical washers 52 are provided, with each washer 52 having a central aperture disposed around a respective one of the joining bolts 46 and above a respective one of the tripod plates 50. The washer 52 has a lower surface 52a as illustrated in FIG. 13 which is complementary to the spherical seat 56 of the tripod plate 50 and is disposed in slidable contact therewith. In the exemplary embodiment illustrated in FIG. 13, the washer lower surface 52a is convex outwardly and complementary to the spherical seat 56 for allowing relative sliding rotation movement therebetween. The washer 52 also includes a flat upper surface 52b against which the flat lower surface of the locknut 48 is engaged.

Since manufacturing tolerances prevent perfect alignment of assembled parts, the spherical washer 52 can be rotated as required in the spherical seat 56 so that the flat upper surface 52b is perpendicular to the centerline axis of the joining bolt 46 to allow the locknut 48 to be tightened on the bolt 46 in pure tension without inducing bending loads in the bolt 46. FIG. 13 illustrates the slight misalignment between the central aperture of the washer 52 and the access hole 62 for accommodating manufacturing tolerance mismatch between the components. The components are nevertheless readily assembled together with the two buttons 58 and the foot 60 providing three points of contact, and the spherical washer 52 in its complementary seat 56 always ensuring a flat upper surface 52b for engagement with the flat undersurface of the locknut 48. The foot 60 is preferably conical and is tapered from a maximum diameter at its root end to a minimum diameter at its tip end. Correspondingly, the indentation 64 is also preferably conical with a greater taper than that of the foot 60, with a maximum diameter adjacent the band outer surface and a minimum diameter at the bottom of the indentation 64. In this way, the foot 60 fully engages the indentation 64 around a circle of contact preventing relative movement therebetween irrespective of manufacturing tolerances of the foot 60 and indentation 64.

Furthermore, the diameter of the access hole 62 is made sufficiently large to accommodate manufacturing tolerances to ensure that the tripod plate 50 does not contact the joining bolts 46 after assembly. The locknuts 48 may then be conventionally torqued onto the bolts 46 to preload the tripod plates 50 to join together the respective outer bands and panels 38, 42 and the inner bands and panels 40, 44 to complete the assembly while still allowing sliding movement of the respective outer and inner panels 42, 44 on the buttons 58.

As shown in FIG. 13, each respective edge of the outer and inner panels 40, 42 such as the second edge 42b circumferentially overlaps by a predetermined distance L respective edges of the outer and inner bands 38, 40 such as the first edge 38a illustrated in FIG. 13. The joining bolts 46 are disposed adjacent to and spaced circumferentially from the respective outer and inner panel first and second edges 42a, 42b, 44a, 44b at an initial spacing S for allowing limited unobstructed movement therebetween. Accordingly, relative tangential or circumferential movement between the panels and bands such as between the outer panel 42 and the outer band 38 illustrated in FIG. 13 either decreases or increases the magnitude of the circumferential space S relative to the bolt 46 by sliding along the buttons 58. The friction forces due to such sliding are reacted through the tripod plates 50 themselves around the bolts 46 and through the feet 60 into the respective bands, such as the outer band 38, through the location indentations 64. In this way, friction loads between the bands and panels bypasses the bolt 46 to prevent bending thereof.

The improved joint described above is also tolerant to wear of the components during operation. Since the tripod plate 50 is supported by the spaced apart buttons 58 and foot 60, it preferably is sized relatively thin in thickness to provide a predetermined amount of flexibility or elasticity thereof so that the central region of the tripod plate 50 between the buttons 58 and foot 60 is initially elastically deflected toward the head of the bolt 46 when the locknut 48 is tightened. The preload clamps the buttons 58 against the contacting surfaces of the panels 42, 44 to provide clamped and sealed joints against the cooperating outer and inner bands 38, 40 at their edges. As wear occurs at the two buttons 58 during operation, the tripod plate 50 remains in contact with the respective panels 42, 44, and the elastic or spring action of the tripod plate 50 will necessarily decrease the normal contact load acting on the panels through the buttons 58. Wear rate is directly proportional to contact load, and therefore wear will decrease the contact load eventually to the magnitude where the resulting wear rate is insignificant while still providing an effective seal between the overlapping panels and bands.

This joint design is also tolerant to a substantial variation in preload of the joining bolts 46. Excessive preload on the bolts 46 will lead to rapid wear of the buttons 58 and creep of the tripod plate 50 both of which will rapidly reduce the clamp load through the joining bolts 46, and accordingly the wear at the buttons 58 for maintaining suitable sealing while providing an effective useful life of the joined assembly. In this regard, the joint is self-adjusting for variations in initial clamping loads. Nevertheless, a finite value of the clamping load will remain during the lifetime of the joint to maintain an effective seal at the overlapping bands and panels and prevent excessive vibration which could otherwise prematurely wear the parts.

Once assembled as shown in FIG. 4, the panels 42, 44 are allowed to move without restraint in the circumferential direction relative to the respective bands 38, 40 for accommodating differential thermal expansion and contraction therebetween during operation. The collective assembly of the individual airfoils 36 joined to the outer and inner panels 42, 44 provides a circumferentially segmented assembly which is allowed to freely expand and contract in the radial direction, with the outer and inner panels 42, 44 being also allowed to freely move in the circumferential direction relative to the airfoils 36 for reducing thermally induced stresses therein. Furthermore, the joining arrangement between the bands 38, 40 and the respective panels 42, 44 provides an effective seal therebetween without the difficulties encountered in conventional straight spline seals, or without undesirable bending of the bolts 46. Whereas conventional spline seals require precisely machined retaining slots and a precisely aligned straight spline seal member therein, the seal provided at the overlapping bands and panels is not dependent on maintaining precise manufacturing tolerances on the assembled parts, which provides a substantial increase in sealing efficiency over that provided by conventional spline seals.

Furthermore, the plurality of axially spaced apart joining bolts 46 provide an effective solution to joining relatively axially long flowpath segments with effective sealing therebetween. The bolts 46 are preferably spaced as closely adjacent to each other as required for ensuring effective clamping together of the bands and panels between adjacent bolts 46. And, during operation of the flowpath assembly 32, any creep-induced distortions thereof will provide little degradation of the sealing ability between the overlapping panels and bands since the elastic tripod plates 50 will maintain suitable clamping loads between the panels and bands. This is an improvement over conventional spline seals which lose ability to provide effective seals if the alignment between their complementary slots containing the spline seal member is distorted during operation.

In the preferred embodiment, the inner and outer band edges 38a, 38b, 40a, 40b provide relatively small circumferentially extending overhangs relative to the airfoil 36 as shown most clearly in FIG. 4 to merely provide sufficient circumferential extent for supporting the joining bolts 46. In this way, the manufacturing tolerances and distortions due to creep during operation are relatively small at these edges for improving the alignment between the band edges and the panel edges for improved assembly thereof.

Yet further, the exemplary flowpath assembly 32 illustrated in FIG. 2 has a highly curved configuration for channeling the combustion gases 30 at inclination radially outwardly from the HPT 22 to the LPT 24 while still providing effective sealing between the bands and panels. As shown in more particularity in FIGS. 5, 9, and 11, at least one of the outer and inner panels 42, 44 and respective bands 38, 40 may be curved or nonlinear in axial transverse section as shown, with the joining bolts 46, tripod plates 50, washers 52, and locknuts 48 still being effective for joining together the respective panels and bands for maintaining alignment and sealing therebetween. In this exemplary embodiment, the outer band 38 and outer panel 42 are generally straight along the axial extent of the spaced bolts 46, whereas the inner band 40 and inner panel 44 are curved in axial transverse section along the axial extent of the bolts 46. The resulting flowpath is required for aerodynamic reasons, and the use of conventional spline seals would increase the difficulty and complexity of designing the assembly, and would result in leakage rates commensurate with spline seals sized for large diameter and axial extent applications. However, by joining together the bands and panels in accordance with the present invention, an improved seal therebetween may be maintained along the entire axial extent of even the curved inner bands 40 and inner panels 44 in accordance with the present invention.

Referring again to FIG. 2, the turbine flowpath assembly 32 is in the exemplary form of a transition duct disposed between the HPT 22 and the LPT 24 which further includes a conventional turbine center frame 66. The turbine frame 66 conventionally includes a plurality of radially extending struts 68. The airfoils 36 are hollow with corresponding openings through the outer and inner bands 38 and 40 as additionally shown in FIGS. 6 and 7, and each of the struts 68 extends radially through a respective one of the airfoils 36 and is conventionally joined to the outer casing 34 at radially outer ends thereof. The radially inner ends of the struts 68 are conventionally joined to a conventional annular hub 70. The airfoils 36 act as fairings which protect the struts 68 from the hot combustion gases 30. A portion of the compressed air 28 may be conventionally channeled through each of the airfoils 36 for providing effective cooling thereof.

As shown in FIG. 2, the HPT 22 includes a last stage turbine blade-row 22a disposed upstream of the airfoils 36, and a conventional circumferentially segmented, annular shroud 72 is disposed radially outwardly of the blade-row 22a for maintaining a suitable gap therewith as is conventionally known.

The outer bands and panels 38, 42 are joined to the outer casing 34 preferably in radial alignment with the shroud 72 for providing a radially aligned radially outer flowpath for the combustion gases 30. Similarly, the outer bands and panels 38, 42 are also radially aligned with a conventional shroud surrounding the LPT 24, and the inner bands and panels 40, 44 are radially aligned with the conventional inner platforms at the roots of the blades of the last stage blade-row 22a of the HPT 22 and of the blades of the first stage of the LPT 24.

During operation of the engine 10, the outer casing 34 is maintained at a relatively lower temperature than that of the shroud 72 and the outer and inner panels 42, 44 which are directly in contact with the hot combustion gases 30 flowing therepast. Since the shroud 72 is conventionally circumferentially segmented, thermally induced distortion and stress therein is reduced and the shroud 72 is allowed to expand radially with the radial movement of the outer casing 34. A conventional fully annular, non-segmented transition duct disposed downstream of the blade-row 22a would conventionally be subject to thermal distortion and radial expansion which leads to radial misalignment between the upstream end of its outer flowpath and the downstream end of the shroud 72 which causes aerodynamic losses in the combustion gases 30. However, the turbine flowpath assembly 32 of the present invention is also circumferentially segmented which allows the outer bands and panels 38, 42 to expand and contract without restraint in the circumferential direction as compared to a fully annular continuous ring, and the outer bands and panels 38, 42 similarly move with the outer casing 34 to which they are attached. In this way, radial alignment between the shroud 72 and the forward ends of the outer bands and panels 38c and 42c is more accurately maintained.

As shown in FIGS. 5, 6, 8, and 9, each of the outer bands and panels 38, 42 includes a generally L-shaped forward hook 38e and 42e, respectively, extending radially outwardly from each of the forward ends 38c, 42c thereof which are conventionally fixedly joined to a radially inner flange of the outer casing 34 as shown in FIG. 2, for example. The hooks 38e, 42e are similar to those used in conventional shrouds, such as the shroud 72, for supporting the forward ends of the outer bands and panels 38c, 42c to the outer casing 34. The aft ends of the outer bands and panels 38d, 42d include a plurality of circumferentially spaced apart mounting bolts 74 extending radially outwardly therefrom which are used to fixedly join the aft ends 38d, 42d to an aft mounting bracket 76 extending radially inwardly from the outer casing 34 as shown in FIG. 2. The hooks 38e, 42e and the mounting bolts 74, and complementary nuts, fixedly join the outer bands and panels 38, 42 to the outer casing 34. In turn, the airfoils 36 and inner bands and panels 40, 44 are also supported and suspended from the outer casing 34. The aft mounting bracket 76 may include oversized apertures for receiving therethrough the mounting bolts 74 to allow for unrestrained axial expansion and contraction of the outer bands and panels 38, 42 if desired.

Although the turbine flowpath assembly 32 has been described above with respect to the exemplary transition duct between the HPT 22 and the LPT 24, it may also be practiced for turbine nozzles channeling the combustion gases 30 to turbine blade-row stages such as the blade-row 22a, for example. The assembly 32 in accordance with the present invention provides improved mounting, sealing, and alignment for relatively large diameter and relatively axially long flowpath segments in this exemplary embodiment. The airfoils 36 including their bands 38, 40 are preferably separate components and independent of the outer and inner panels 42, 44.

Accordingly, the discrete airfoils 36 and panels 42, 44 may be separately manufactured by any suitable technique specific to their particular configurations. For example, conventional centrifugal casting may be used for the panels 42, 44 with conventional lathe turning operations for providing the required configurations for each design application. And, the airfoils 36 including the integral bands 38, 40 may be separately manufactured using conventional casting techniques. As shown in FIGS. 6, 7, 8, and 10, the back sides of the bands 38, 40 and panels 42, 44 preferably have integrally formed structural ribs to provide strength with low weight, whereas the opposite, flow sides thereof are smooth. As shown in phantom line in FIG. 3, additional reinforcing ribs 78 may be suitably joined to the panels 42, 44 for further increasing strength if desired.

As described above, the outer and inner panels 42, 44 are suitably mechanically attached to the outer and inner bands 38, 40 with improved alignment therebetween during initial assembly thereof as well as during subsequent operation. The short overhang distance of the bands 38, 40 relative to the airfoils 36 provides maximum dimensional stability during manufacture. The resulting clamping together of the bands and panels provides effective sealing for preventing the compressed air 28 from flowing between the outer bands and panels 38, 42 into the flow ducts 54, as well as seals the combustion gases 30 within the flow ducts 54.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A tripod plate for use in joining together by a bolt and a nut, a band and an overlapping panel in a gas turbine flowpath assembly comprising:
   an upper surface having a concave spherical seat therein;
   an oppositely facing inner surface having a pair of laterally spaced apart elevated buttons at a first end of said plate configured for contacting said panel to allow sliding movement thereon, and an elevated foot spaced from said buttons at a second, opposite end of said plate and configured for resting in an indentation in said band to lock said foot into position on said band and allow sliding movement of said panel relative to said band; and
   an access hole extending through said plate from said spherical seat to said inner surface between said buttons and said foot for receiving said bolt.

2. A tripod plate according to claim 1 wherein said foot is aligned equidistantly between said buttons in a tripod configuration.

3. A tripod plate according to claim 2 wherein said buttons have identical heights.

4. A tripod plate according to claim 3 wherein said buttons are shorter than said foot for contacting said panel overlapping said band as said foot contacts said band.

5. A tripod plate according to claim 4 wherein said buttons are convex for allowing sliding movement on said panel.

6. A tripod plate according to claim 5 wherein said band indentation is conical; and said foot is conical and is tapered from a maximum diameter at a root end thereof to a minimum diameter at a tip end thereof for resting in said band indentation.

7. A tripod plate according to claim 4 having a thickness between said buttons and said foot effective for providing a predetermined amount of flexibility so that a central region between said buttons and said foot is elastically deflectable upon tightening of said bolt to clamp together said band and panel.

8. A tripod plate according to claim 4 in combination with a spherical washer having a flat upper surface and a convex spherical lower surface being complementary to said tripod plate concave spherical seat for being disposed in slidable contact therewith.

* * * * *